(12) United States Patent
Roske et al.

(10) Patent No.: US 11,827,323 B1
(45) Date of Patent: Nov. 28, 2023

(54) MARINE PROPELLER

(71) Applicant: Brunswick Corporation, Mettawa, IL (US)

(72) Inventors: Daniel A. Roske, Fond du Lac, WI (US); Jeffrey D. Reifsnyder, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 17/589,073

(22) Filed: Jan. 31, 2022

(51) Int. Cl.
| | |
|---|---|
| *B63H 1/26* | (2006.01) |
| *B63H 1/20* | (2006.01) |
| *C23C 18/31* | (2006.01) |
| *C23C 18/16* | (2006.01) |
| *B29D 99/00* | (2010.01) |
| *B63H 1/14* | (2006.01) |
| *B29K 105/08* | (2006.01) |

(52) U.S. Cl.
CPC ........... *B63H 1/26* (2013.01); *B29D 99/0025* (2013.01); *B63H 1/14* (2013.01); *B63H 1/20* (2013.01); *C23C 18/1641* (2013.01); *C23C 18/31* (2013.01); *B29K 2105/08* (2013.01)

(58) Field of Classification Search
CPC .... B63H 1/14; B63H 1/20; B63H 1/26; B63B 2231/02; B63B 2231/10; B63B 2231/40; B63B 2231/52; B63B 2241/00
See application file for complete search history.

(56) References Cited

U.S. PATENT DOCUMENTS

| | | | |
|---|---|---|---|
| 2,201,706 A | 5/1940 | Sukohl | |
| 3,033,293 A | * 5/1962 | Bihlmire | B63H 1/14 416/240 |
| 4,492,522 A | 1/1985 | Rossmann et al. | |
| 4,648,921 A | 3/1987 | Nutter, Jr. | |
| 5,145,320 A | 9/1992 | Blake et al. | |
| 5,219,272 A | 6/1993 | Steiner et al. | |
| 5,236,310 A | 8/1993 | Koepsel et al. | |
| 5,290,147 A | 3/1994 | Karls et al. | |

(Continued)

FOREIGN PATENT DOCUMENTS

KR     20140015954 A   * 2/2014

OTHER PUBLICATIONS

MatWeb Material Property Data; Cobblat, Co; viewed on Oct. 11, 2022; https://www.matweb.com/search/DataSheet.aspx?MatGUID=4602449fc566494ab3efa286e8827c99; Overview of materials for Nylon 6, 10% Glass Fiber Filled, viewed on Oct. 11, 2022; (Year: 2022).*

(Continued)

*Primary Examiner* — Brian P Wolcott
(74) *Attorney, Agent, or Firm* — ANDRUS INTELLECTUAL PROPERTY LAW, LLP (57) ABSTRACT

A propeller for a marine propulsion device configured for use on a boat has a hub extending along a longitudinal axis and a plurality of blades, each blade having a blade root attached to the hub and extending radially outwardly from the longitudinal axis toward a respective blade tip. Each blade has a polymer-based core. Each blade is coated from the blade root to the blade tip with a metal coating. A method of making the propeller includes molding the propeller and coating each blade from the blade root to the blade tip with a metal coating.

6 Claims, 9 Drawing Sheets

(56) References Cited

U.S. PATENT DOCUMENTS

| | | | |
|---|---|---|---|
| 5,433,002 A * | 7/1995 | Nadolink | C23C 4/00 |
| | | | 29/889.6 |
| 5,782,607 A | 7/1998 | Smith et al. | |
| 5,791,874 A | 8/1998 | Lang | |
| 6,340,290 B1 | 6/2002 | Schott et al. | |
| 6,960,065 B2 | 11/2005 | Leach | |
| 7,637,722 B1 * | 12/2009 | Koepsel | B63H 1/14 |
| | | | 416/241 R |
| 8,079,822 B2 | 12/2011 | Kitsunai et al. | |
| 8,083,490 B2 | 12/2011 | Kitsunai et al. | |
| 8,105,046 B2 | 1/2012 | Kitsunai et al. | |
| 8,851,858 B2 | 10/2014 | Towkan | |
| 9,587,645 B2 * | 3/2017 | Guglielmin | C23C 30/00 |
| 9,663,663 B2 | 5/2017 | Hong | |
| 9,664,201 B2 | 5/2017 | Dudon et al. | |
| 9,745,948 B1 | 8/2017 | Koepsel | |
| 9,964,117 B2 | 5/2018 | Schreiber et al. | |
| 10,138,738 B2 | 11/2018 | Obuchi et al. | |
| 10,486,795 B2 | 11/2019 | Methven | |
| 2002/0197152 A1 | 12/2002 | Jackson et al. | |
| 2003/0116441 A1 | 6/2003 | Kempin | |
| 2011/0129351 A1 | 6/2011 | Das et al. | |
| 2012/0269639 A1 * | 10/2012 | Sato | B63H 1/26 |
| | | | 416/223 R |
| 2014/0255722 A1 | 9/2014 | Nagarajan et al. | |
| 2015/0086379 A1 | 3/2015 | Pentony | |
| 2015/0191233 A1 * | 7/2015 | Hawkins | F01D 5/28 |
| | | | 416/241 A |
| 2015/0285184 A1 | 10/2015 | Sawyers-Abbott | |
| 2017/0127477 A1 | 5/2017 | Sandiford | |
| 2017/0355446 A1 | 12/2017 | Andrzejewski | |

OTHER PUBLICATIONS

Carlton, J.S., "Propeller Blade Strength", Highly Skewed Propeller, Science Direct, https://www.sciencedirect.com/topics/engineering/highly-skewed-propeller, 2012, 11 pages.

Koko, T. S. et al., "Review of Composite Propeller Developments and Strategy for Modeling Composite Propellers Using PVAST", Defense R&D Canada—Atlantic, Contract Report, DRDC Atlantic CR 2011-156, Sep. 2012, 46 pages.

Lin, G., "Comparative Stress/Deflection Analyses of a Thick-Shell Composite Propeller Blade", Ship Hydromechanics Department Research and Development Report, DTRC/SHD-1373-01, Dec. 1991, 72 pages.

Yeo, K. et al., "Prediction of Propeller Blade Stress Distribution Through FEA", Science Alert, https://scialert.net/fulltext/?doi=jas.2014.3046.3054, Sep. 5, 2014, 10 pages.

Roske et al., "Marine Propeller," U.S. Appl. No. 17/589,089, filed Jan. 31, 2022 (drawings and specification only).

Roske et al., "Marine Propeller," U.S. Appl. No. 17/589,104, filed Jan. 31, 2022 (drawings and specification only).

Yu et al., "Numerical Analysis of Blade Stress of Marine Propellers," research article in Journal of Marine Science and Application, published Oct. 9, 2020.

* cited by examiner

MARINE PROPELLER

FIELD

The present disclosure relates to marine propellers, more specifically, to propellers for use on marine propulsion devices intended for installation on boats.

BACKGROUND

U.S. Pat. No. 4,648,921 discloses an improved method for forming articles, especially airfoils, comprised of a fiber reinforced plastic bonded to a metal object. In the manufacture of a propeller blade a subassembly is made by coating a metal spar with a certain class of adhesive to a depth of 5-40 mils to compensate for dimensional variations in the spar surface, transferably coating the interior of a subassembly mold with the adhesive, then inserting the coated spar into the mold and injecting a lightweight filler material. The adhesive and filler are then precured and the subassembly removed from the mold. A fibrous reinforcing material, such as glass fiber cloth, is then used to cover or wrap the subassembly, the subassembly thus covered is placed in a second mold and a synthetic polymeric material such as epoxy resin, previously or subsequently applied, is then cured. In the formation of other articles, the filler material might be entirely omitted, and the reinforcing fibers would be separated from a metal substrate only by the precured adhesive.

U.S. Pat. No. 5,219,272, which is hereby incorporated by reference herein, discloses a marine propeller including a hub rotatable about a longitudinal axis and having a plurality of blades extending radially outwardly therefrom and pivotable about respective radial pivot axes between a low pitch position and a high pitch position. Each blade has a hydrodynamic force characteristic which shifts the location of the resultant hydrodynamic force on the blade in a direction aiding up-pitching of the blade, and increasing the up-pitching pivot moment with decreasing angles of attack. A counteractive hydrodynamic force generating area is provided on the negative pressure backside surface of the blade and shifts the location of the resultant hydrodynamic force on the frontside surface forwardly with decreasing angle of attack. The blade is pivoted by increased water flow along the counteractive hydrodynamic force generating area with decreasing angles of attack, which increased water flow generates a backside hydrodynamic force on the blade at the counteractive hydrodynamic force generating area spaced from the pivot axis by a moment arm provided by the section of the blade between the pivot axis and the counteractive hydrodynamic force generating area, such that the backside hydrodynamic force acting on the moment arm pivots the blade to an increased pitch position. The counteractive hydrodynamic force generating area on the backside surface at the rearward trailing portion separates water flow along the backside surface at high angles of attack, and re-attaches water flow along the backside surface at low angles of attack to change the backside surface at the rearward trailing portion to a positive pressure area to generate the up-pitching moment.

U.S. Pat. No. 5,236,310, which is hereby incorporated by reference herein, discloses a marine propeller that combines progressive pitch with both increasing pitch and increasing progressiveness of pitch along at least a portion of increasing radii from the axis of rotation to the outer blade tip. A five blade propeller is provided which accommodates thermal warpage of the outer blade tips, such that the same propeller includes two different types of blades, one blade having increasing pitch with increasing radii all the way to the outer blade tip, and the other type of blade having increasing pitch to a given radius and then decreasing pitch with increasing radii to the outer blade tip. The latter blade type is preferred and has a hump in the pressure surface at the noted given radius between portions of increasing and decreasing pitch with increasing radii.

U.S. Pat. No. 5,290,147, which is hereby incorporated by reference herein, discloses a marine propeller including a hub rotatable about a longitudinal axis and having a plurality of blades extending radially outwardly therefrom and pivotable about respective radial pivot axes between a low pitch position and a high pitch position. A disc has a plurality of guide slots each receiving and retaining a respective lever arm extending rearwardly within the hub from a respective blade. A biasing spring coaxial with the longitudinal axis of rotation of the hub biases the disc to in turn bias the lever arms and blades to the low pitch position. The disc is a generally flat planar plate-like member extending radially outwardly from the longitudinal axis at the rear of the hub and includes a preload mechanism accessible at the rear of the hub for adjusting the bias. The disc restricts movement of the lever arms along the guide slots such that the lever arms can move only in unison, which prevents blade flutter. Pivoting of the blades is controlled by both a) movement of the lever arms along the guide slots, and b) arcuate movement of the guide slots as the disc rotates about the longitudinal axis, such that pivoting of each blade from its low pitch position to its high pitch position requires both a) movement of the respective lever arm along its respective guide slot, and b) rotation of the disc to arcuately move the guide slot.

U.S. Pat. No. 5,791,874, which is hereby incorporated by reference herein, discloses a marine propeller including a hub rotatable about a longitudinal axis and having a plurality of blades extending outwardly from the hub. Each of the propeller blades includes a fixed propeller blade stem and a removable cup extension. The cup extension defines the trailing edge of each propeller blade and is removably mounted to the propeller blade stem. The cup extensions can selectively be removed from the blade stems and new cup extensions attached in order to modify the amount of cupping included on the propeller.

U.S. Pat. No. 6,340,290, which is hereby incorporated by reference herein, discloses a controllable pitch propeller that is provided with a blade that naturally tends to rotate in a direction toward maximum pitch as a result of the hydrodynamic forces on the blade. As a result, the blade will move toward a pitch position of increased pitch magnitude in the event that a control system failure occurs. If the blades of a propeller move naturally toward their maximum pitch position in the event of a hydraulic, mechanical, or electrical failure in the pitch control system, the propeller will be operable and will allow a marine vessel operator to navigate toward port even with a propeller pitch control system that has malfunctioned.

U.S. Pat. No. 7,637,722, which is hereby incorporated by reference herein, discloses a marine propeller that is provided with three blades, a skew angle of approximately 33 degrees, a rake angle of approximately 28.5 degrees, and a blade area ratio (BAR) of approximately 60 degrees. The rake is preferably progressive. Each of the blades is preferably tail loaded.

U.S. Pat. No. 9,664,201 discloses a method of making a reinforcement for reinforcing a leading edge of a blade, the method including depositing a metal coating on the leading edge by thermal spraying in compression. A blade, for example a blade for a turbine engine, a helicopter, or a propeller, can have the leading edge protected by such a reinforcement.

U.S. Pat. No. 9,745,948, which is hereby incorporated by reference herein, discloses a marine propeller having an outer hub having a central axis and a blade having a blade root attached to the outer hub and extending radially outward from the outer hub toward a blade tip. The blade has a leading edge and a trailing edge. The propeller has a diameter between about 15 inches and about 17 inches and a pitch between about 14 inches and about 24 inches. The blade has a progressive rake angle such that a first local rake angle at the blade root is less than a second local rake angle at the blade tip. A combination of the diameter, pitch, and progressive rake angle provides a marine vessel to which the marine propeller is coupled with minimum drag while the marine vessel is operating at less than a maximum vessel speed. A method of designing a propeller is also disclosed.

U.S. Pat. No. 9,964,117 discloses a compressor blade of a gas turbine having an airfoil and a blade root, said blade root and airfoil being made in one piece from a fiber-composite material, as well as a leading edge protector made from a sheet metal material, characterized in that the airfoil is provided with a radial groove extending substantially over the entire length of the airfoil and that the leading edge protector is detachably clamped onto the airfoil and is fixed with a sheet metal flange in the radial groove of the airfoil.

U.S. Pat. No. 10,138,738 discloses a composite vane body formed of a composite material of a thermosetting resin or a thermoplastic resin, and reinforced fibers, and a metal sheath that is bonded to a leading edge section of the composite vane body via a soft adhesive to cover the leading edge section, and an adhesive filling section in which the soft adhesive is filled, a plurality of leading edge side contact sections that come into contact with a curved section corresponding to a leading edge of the metal sheath, and a plurality of protrusions that come into contact with a planar section corresponding to a vane surface of the metal sheath, with at least a same height as a thickness of a layer of a requisite amount of the soft adhesive filled in the adhesive filling section are formed in the leading edge section of the composite vane body. Attachment of the metal sheath to the leading edge section can be performed easily with high precision.

U.S. Patent Application Publication No. 2011/0129351 discloses a composite airfoil having a leading edge protective strip made by the method of utilizing a cold spray deposition system to deposit the protective strip onto a leading edge of the composite airfoil.

U.S. Patent Application Publication No. 2014/0255722, which is hereby incorporated by reference herein, discloses corrosion resistant, grain-refined and/or amorphous Ni- and Cu-free Co-bearing coatings on polymer substrates for use in human contact applications, including industrial products, automotive products, medical surgical devices, and medical products.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

According to one example of the present disclosure, a propeller for a marine propulsion device configured for use on a boat comprises a hub extending along a longitudinal axis and a plurality of blades, each blade having a blade root attached to the hub and extending radially outwardly from the longitudinal axis toward a respective blade tip. Each blade comprises a polymer-based core. Each blade is coated from the blade root to the blade tip with a metal coating.

In one example, each blade has a blade face and a blade back and each blade is coated with the metal coating over the entireties of the blade face and the blade back thereof.

In one example, the hub comprises a polymer-based core and is coated with the metal coating.

In one example, the metal coating is thicker at each blade root than at each blade tip. In one example, the metal coating at each blade tip has a thickness that is about 25% to about 35% of a thickness of the metal coating at each blade root. In one example, the thickness of the metal coating at each blade tip is less than or equal to 0.005 inches.

In one example, the core of each blade has a design yield strength of at least 9000 psi.

In one example, the propeller is configured such that a maximum stress on each metal coated polymer-based blade when the propeller is producing a maximum thrust is about 15% to about 25% of a design yield strength of the metal coated polymer-based blade.

In one example, the metal coated polymer-based blades have a maximum cross-sectional thickness that is less than a maximum cross-sectional thickness of blades of an aluminum propeller having the same power rating as the propeller having the metal coated polymer-based blades.

In one example, the metal coating has a higher elastic modulus and a higher yield strength than the polymer-based core.

In one example, the metal coating comprises cobalt and the core of each blade comprises a fiber-reinforced plastic.

According to another example of the present disclosure, a method of making a propeller for a marine propulsion device configured for use on boat comprises molding a propeller having a hub extending along a longitudinal axis and a plurality of blades, each blade having a polymer-based core and having a root attached to the hub and extending radially outwardly from the longitudinal axis toward a respective blade tip. The method also includes coating each blade from the blade root to the blade tip with a metal coating.

In one example, the step of coating each blade with the metal coating comprises electroless plating each blade with the metal coating.

BRIEF DESCRIPTION OF THE DRAWINGS

Examples are described with reference to the following drawing figures. The same numbers are used throughout to reference like features and components.

DETAILED DESCRIPTION

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal" features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second," "third," etc. is not intended to connote priority or importance, but merely to distinguish one of several similar elements from another. Unless otherwise specified or limited, the word "about" means±10%.

Figure 1:
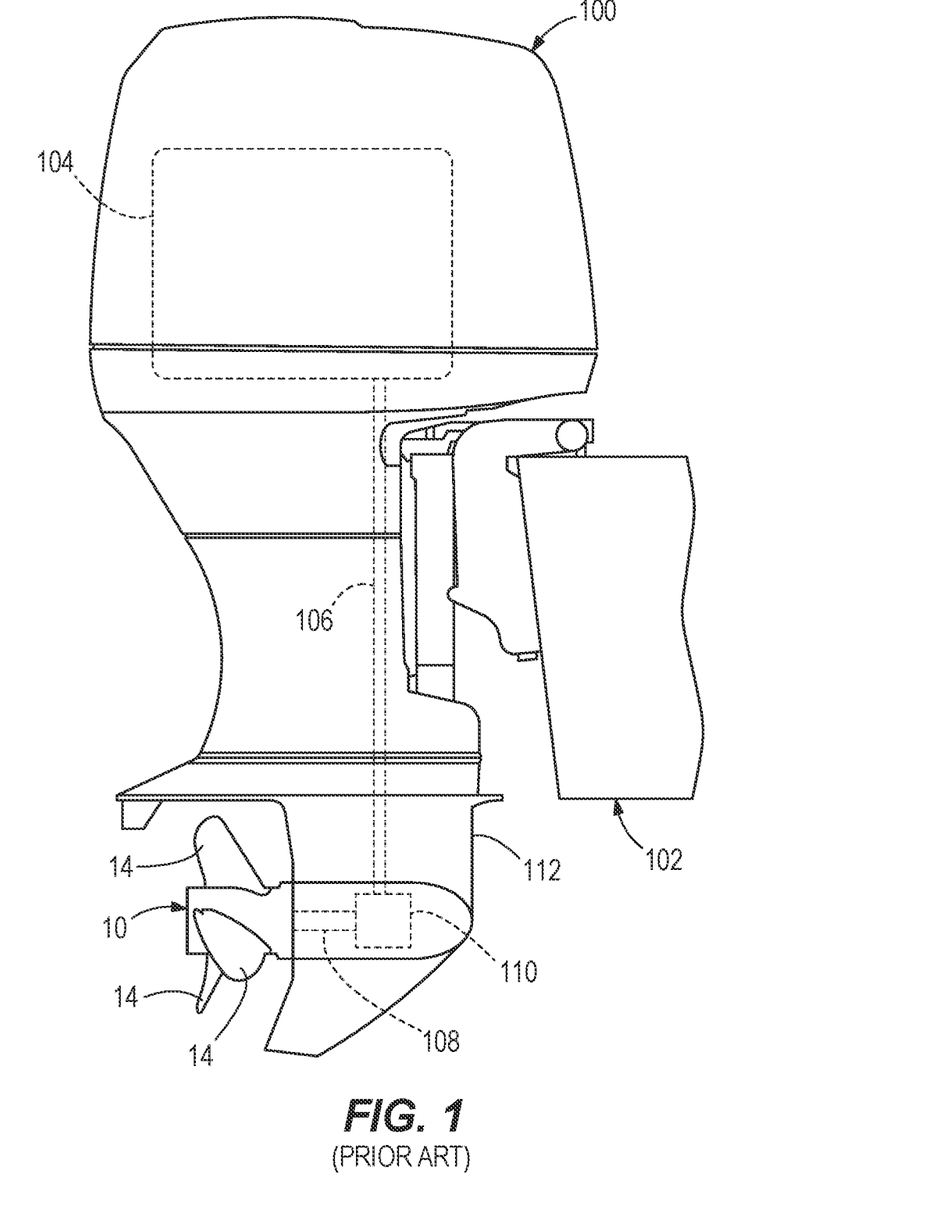
FIG. 1 illustrates a marine propulsion device having a propeller.

FIG. 1 illustrates a marine propulsion device 100 coupled to a transom 102 of a marine vessel (not shown). In the example shown, the marine propulsion device 100 is an outboard motor having a prime mover 104, which may be a diesel or gasoline engine or an electric motor. Although an outboard motor is shown herein, it should be understood that the present disclosure applies equally to other types of marine propulsion devices, such as stern drives, pods drives, or inboard drives. In the example shown, the prime mover 104 is coupled in torque transmitting relationship with an output (drive) shaft 106. The output shaft 106 is connected in torque transmitting relationship with a propeller shaft 108 via a shift mechanism 110 located inside a lower unit 112. Other arrangements for transmitting torque from the output shaft 106 to the propeller shaft 108 could be used. The propeller shaft 108 is coupled to a propeller 10 having a plurality of blades 14. Although, as noted above, the propeller 10 can be used on many types of marine propulsion devices, for purposes of this application, the propeller 10 is intended for use on a boat (that is, in contrast to a ship).

Figure 2:
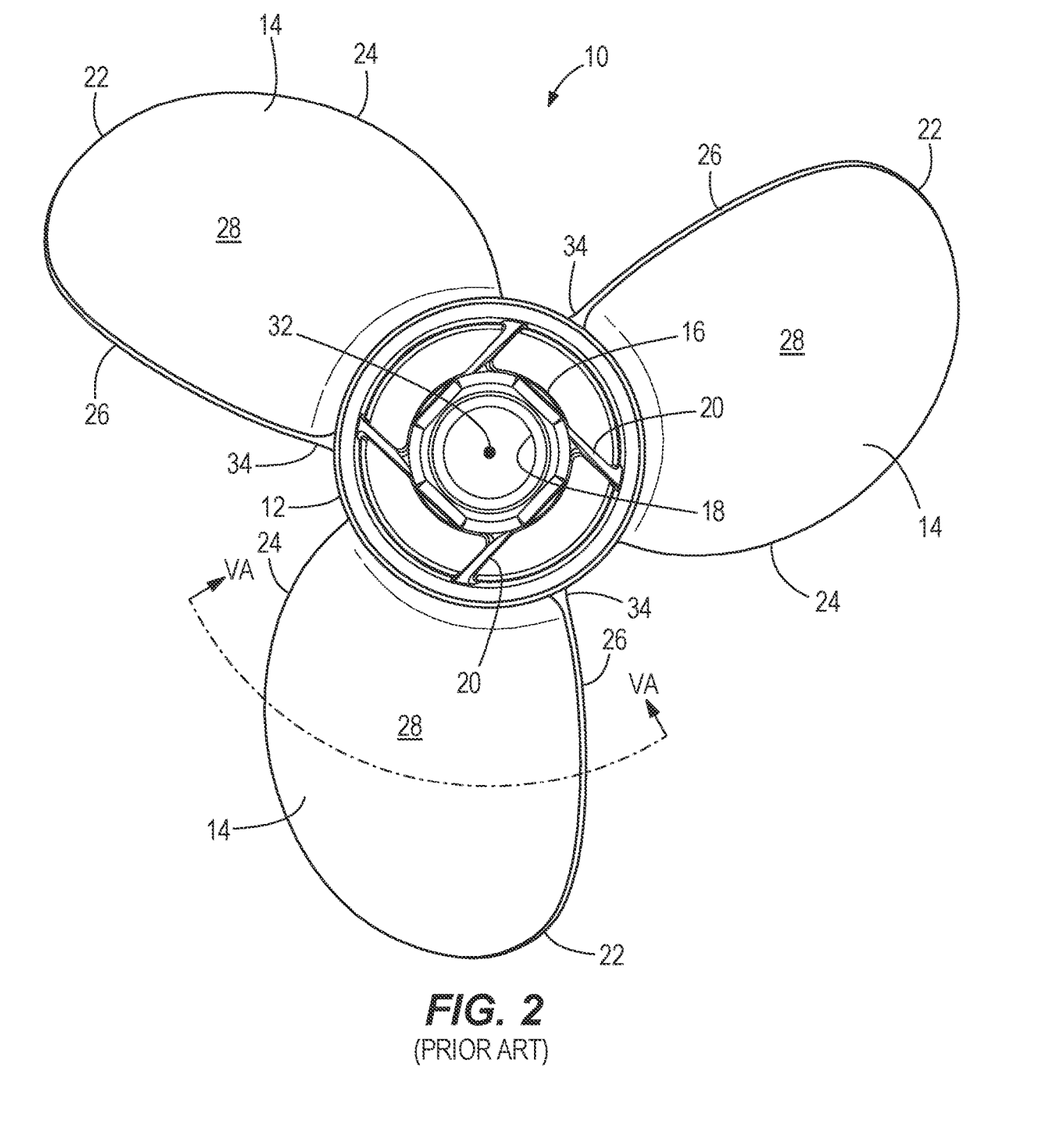
FIG. 2 illustrates a rear view of a propeller according to the prior art.

FIG. 2 shows a view of the propeller 10 as seen from a position behind the marine propulsion device 100. In the central portion of the propeller 10, an outer hub 12 is attached to a plurality of blades 14. Although three blades 14 are shown here, the propeller 10 could have fewer or more blades. An inner hub 16 is rigidly attached to the outer hub 12. An inner radial portion 18 is configured to mate with the propeller shaft 108 of the marine propulsion device 100, such as by way of a splined connection. Ribs 20 connect the outer and inner hubs, 12 and 16. Reference numeral 22 identifies the blade tips, reference numeral 24 identifies the leading edges of the blades 14, and reference numeral 26 identifies the trailing edges of the blades 14. Reference numeral 28 identifies the blade face, or positive pressure side, of each of the blades 14. The opposite surface of each blade 14 is referred to as the blade back, or suction side (see reference numeral 30, FIG. 3), which faces toward the transom 102 of the marine vessel.

With continued reference to FIG. 2, the blade root 34 is the point at which each blade 14 attaches to the outer hub 12. The maximum reach of each blade 14 from a central axis 32 of the propeller hubs 12, 16 is the blade tip 22. The blade tip 22 separates the leading edge 24 from the trailing edge 26. The leading edge 24 is the part of the blade 14 that is closest to the transom 102 of the marine vessel to which the marine propulsion device 100 is attached. The leading edge 24 is the first part of the blade 14 that cuts through the water. The leading edge 24 extends from the blade root 34 at the outer hub 12 to the blade tip 22. The trailing edge 26 is the part of the blade 14 that is farthest from the transom 102 of the marine vessel to which the marine propulsion device 100 is attached. The trailing edge 26 is the edge from which the water leaves the blade 14. It extends from the blade tip 22 to the outer hub 12.

Figure 3:
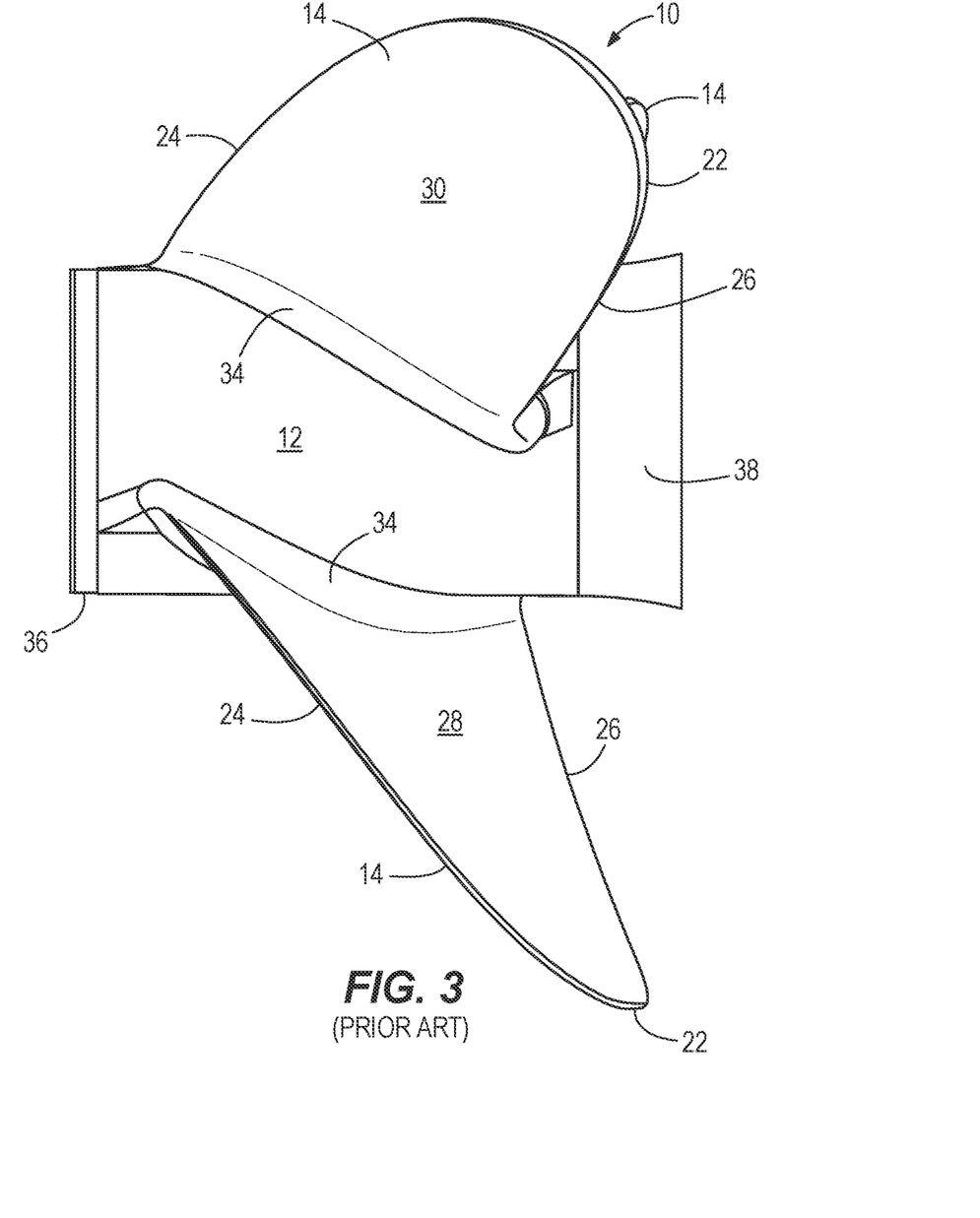
FIG. 3 illustrates a side view of the propeller of FIG. 2.

FIG. 3 is a side view of the propeller 10 of FIG. 2. The front portion of the outer hub 12, identified by reference numeral 36, is shown toward the left in FIG. 3, and the aft end 38 of the outer hub 12 is shown toward the right. As described hereinabove, the blade face 28 is also known as the positive pressure side of the blade 14, as it pushes the water when the marine vessel is moving forward. A curved blade back 30 can be seen on the negative pressure, or suction, side of the blade 14.

Typical marine propellers for boats are made of stainless steel, aluminum, a composite, or combinations thereof. A composite propeller is typically an injection molded, fiber-reinforced plastic (FRP) propeller. In some examples, the inner and outer hubs 12 and 16 will be made of FRP, and the inner hub 16 will be attached to a splined metal insert that is slidable onto the propeller shaft 108. In other examples, the inner hub 16 is made of metal, while the outer hub 12 and ribs 20 are made of FRP. Composite propellers are quite common for low power marine applications because they are inexpensive to produce and provide modest performance. At high power levels, composite propellers are prone to flexing under load, which can be a detriment to boat performance (i.e., top speed). This is due to the blades "losing pitch" as they deflect (i.e., deflecting toward the transom 102 of the marine vessel, toward the left in FIG. 3). Large blade cross-sectional thicknesses are also required to maintain appropriate structural stress in a composite propeller. Large cross-sectional thickness leads to decreased efficiency (i.e., thrust from the propeller 10 versus speed of the prime mover 104). Large blade cross-sectional thicknesses also increase the risk of cavitation at higher vessel speeds, which also lowers efficiency of the propeller.

Meanwhile, stainless steel propellers, while suffering less from the above-noted drawbacks due to their high strength, are much more expensive than their composite counterparts having the same power rating. Aluminum propellers, while costing about as much as composite propellers, are prone to corrosion in salt water and suffer the above-noted drawbacks related to losing pitch under high load.

The present inventors have therefore realized the benefits that could be gained from utilizing the lightweight structure of a composite propeller, combined with the high yield strength and elastic modulus provided by certain types of metals. The present inventors advantageously realized that coating a polymer-based core of a propeller with a metal could decrease blade cross-sectional thickness, thereby increasing efficiency while keeping costs low. The present inventors further realized that localizing the metal coating at key areas could provide strength or flexibility in desired locations on the propeller.

Figure 4:
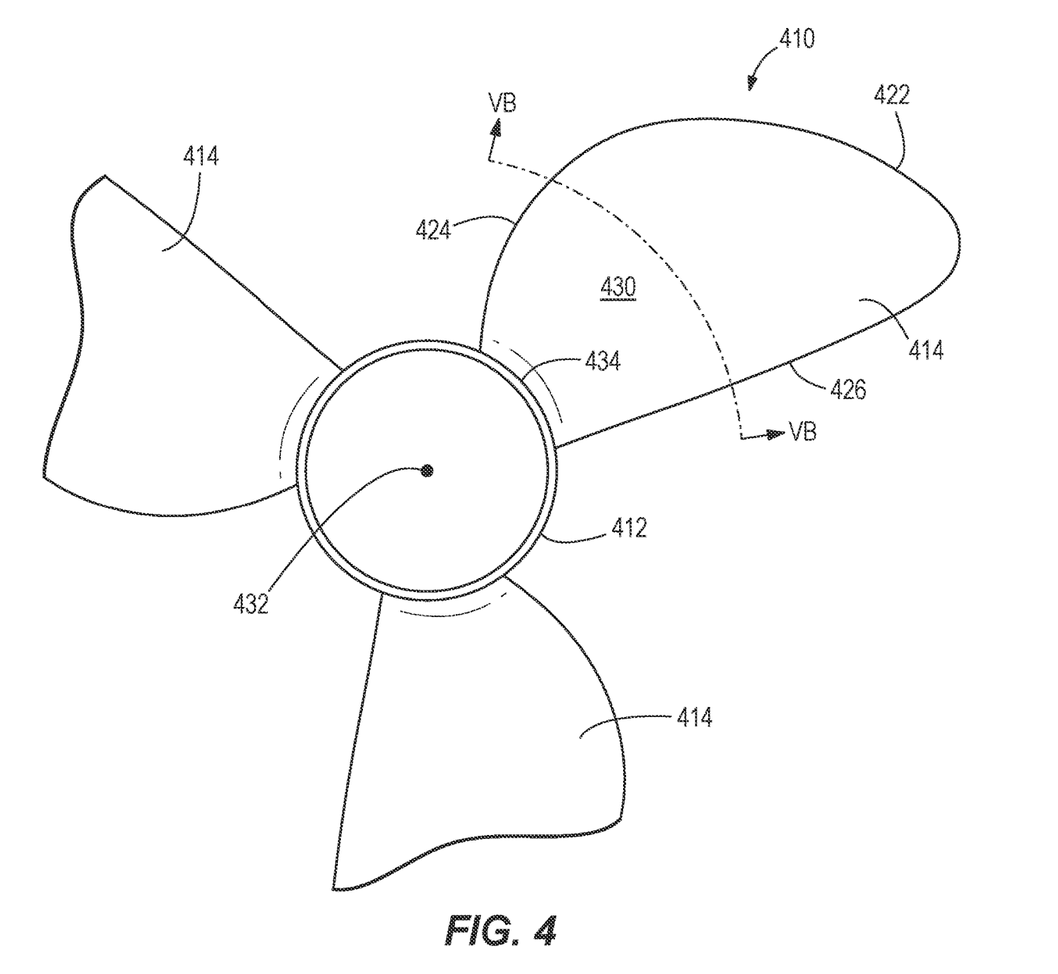
FIG. 4 illustrates a front view of a propeller according to the present disclosure.
Figure 5A:
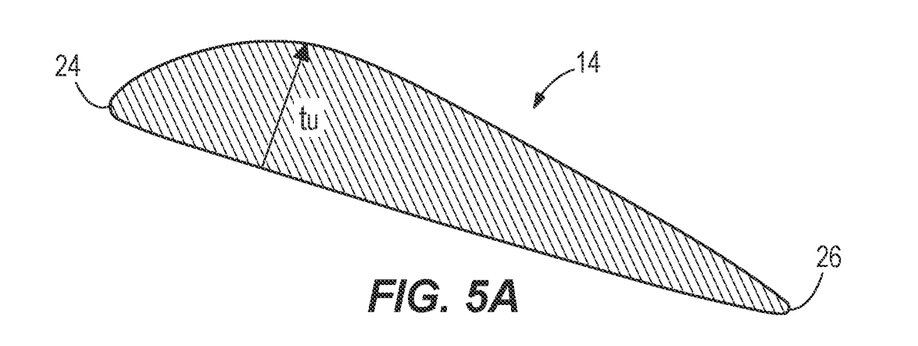
FIG. 5A illustrates a cross-section of a blade of the propeller of FIGS. 2 and 3, taken along the line VA-VA in FIG. 2.
Figure 5B:
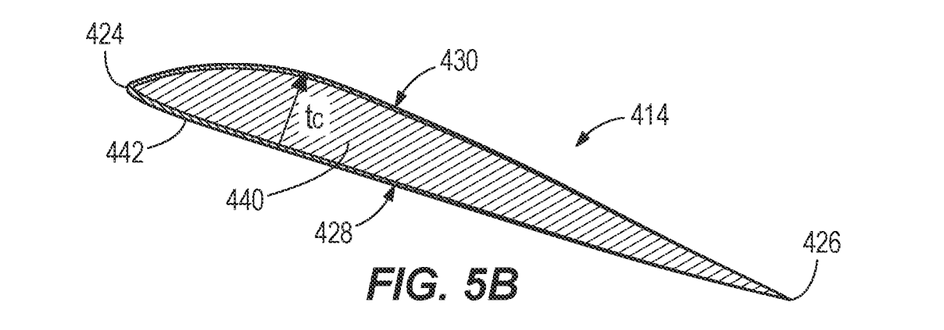
FIG. 5B illustrates a cross-section of a blade of the propeller of FIG. 4, taken along the line VB-VB in FIG. 4.
Figure 6:
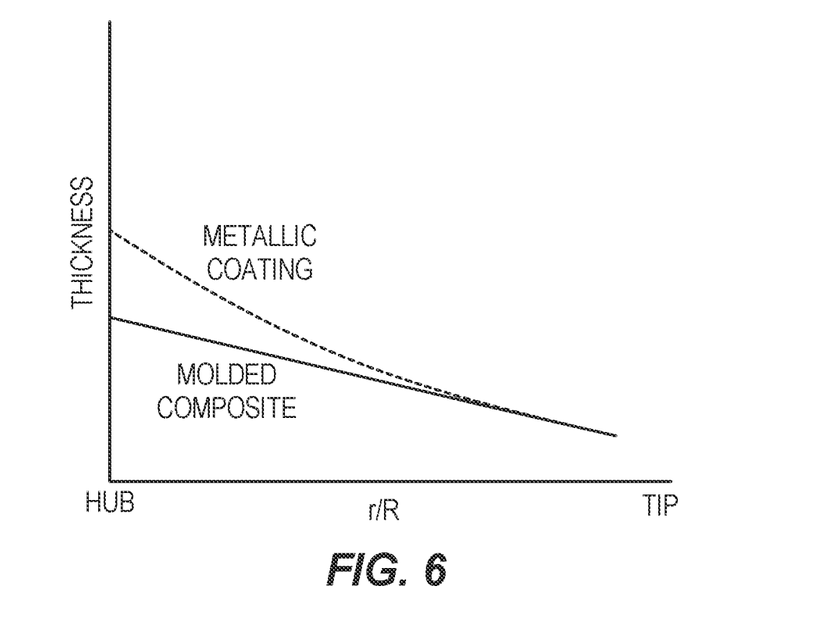
FIG. 6 is a chart depicting the thickness of a metal coating on the blades of the propeller of FIG. 4.

Referring to FIGS. 4, 5B, and 6, according to one example, a propeller 410 for a marine propulsion device configured for use on a boat has blades 414 that are each coated from the blade root 434 to the blade tip 422 with a metal coating 442. Although only one blade 414 is shown in full and labeled, it should be understood that the same description applies to all three blades shown here. Further, it should be understood that fewer or more than three blades can be provided. In FIG. 4, the propeller 410 is shown from a position in front of the marine propulsion device on which the propeller 410 is installed. A cross section of a blade 414 of the propeller 410 is shown in FIG. 5B. The propeller 410 of the present disclosure comprises a hub 412 extending along a longitudinal axis 432 (perpendicular to the page) and a plurality of blades 414. Each blade 414 has a blade root 434 attached to the hub 412 and extends radially outwardly from the longitudinal axis 432 toward a respective blade tip 422. As shown in FIG. 5B, each blade 414 comprises a polymer-based core 440. Each blade 414 is coated from the blade root 434 to the blade tip 422 with a metal coating 442. Each blade 414 has a leading edge 424, a trailing edge 426, a blade face 428, and a blade back 430. Each blade 414 is coated with the metal coating 442 over the entireties of the blade face 428 and the blade back 430 thereof. The hub 412 of the propeller 410 also comprises a polymer-based core and is coated with the metal coating, at least on the outer circumferential surface thereof. In another example, the hub 412 is a metal hub with replaceable metal coated polymer-based blades 414.

As shown by FIG. 6, in some examples, the metal coating 442 is thicker at each blade root 434 than at each blade tip 422. (Note that FIG. 6 shows the relative thicknesses only along one side of the blade, but the metal coating is in fact provided on both the blade face and the blade back.) In some examples, the metal coating 442 at each blade tip 422 has a thickness that is about 25% to about 35% of a thickness of the metal coating at each blade root 434. In one particular example, the thickness of the metal coating 442 at each blade tip 422 is less than or equal to 0.005 inches. The coating at the blade root 434, meanwhile, may be about 0.015 inches or less. In other examples, the metal coating 442 has a uniform thickness of between about 0.005 inches and about 0.015 inches along the entire blade 414, from blade root 434 to blade tip 422. Even such a uniformly coated blade will outperform an aluminum or FRP propeller of the prior art. However, the present inventors have realized that tapering the thickness of the metal coating 442 makes the most efficient use of the coating.

Those having ordinary skill in the art will recognize that the exact thickness of the metal coating 442 will depend on the material properties of the coating and the polymer-based core 440 and is driven by stress levels. In one example, the propeller 410 is configured such that a maximum stress on each metal coated polymer-based blade 414 when the propeller 410 is producing a maximum thrust is about 15% to about 25% of a design yield strength of the metal coated polymer-based blade 414. In one particular example, the propeller 410 is configured such that the maximum stress on each metal coated polymer-based blade 414 when the propeller 410 is producing a maximum thrust is about 20% of the design yield strength of the metal coated polymer-based blade 414. The maximum stress on the metal coated polymer-based blade is the maximum stress in the section at the blade root 434. Thus, providing a thicker metal coating at the blade roots 434 ensures that the added yield strength of the metal coating 442 is concentrated at the blade roots 434, where stress is the highest.

As noted, a cross section of a blade 414 of the propeller 410 is shown in FIG. 5B, while a cross section of a prior art blade 14 (see FIG. 2) is shown in FIG. 5A. With a metal coating 442 having the thickness described hereinabove, the core 440 of each blade 414 is designed to have a design yield strength of at least 9,000 psi. This allows the metal coated polymer-based blades 414 to have a maximum cross-sectional thickness $t_c$ that is less than a maximum cross-sectional thickness $t_u$ of blades 14 of an aluminum propeller 10 having the same power rating as the propeller 410 having the metal coated polymer-based blades 414. For example, compare the maximum cross-sectional thickness $t_c$ of the blade 414 of the present disclosure as shown in FIG. 5B with the maximum cross-sectional thickness $t_u$ of the blade 14 of the prior art propeller 10 shown in FIG. 5A. The present inventors have determined that the design yield strength of the core 440 of the blade 414 can range up to 20,000 psi before a stainless steel propeller might as well be used, as weight, cross-sectional thickness, and cost savings might no longer be realized above such a design yield strength.

The metal coated composite propeller 410 allows for much thinner blade sections, while keeping structural stress at appropriate levels for the composite layup. This is because the metal coating has a significantly higher elastic modulus and yield strength than the composite core and can therefore carry more of the bending load. The propeller 410 has an increased fatigue life in comparison to a FRP propeller due to the yield strength of the metallic coating being larger than that of a FRP propeller alone. The thinner blade sections provide high efficiency to the propeller 410, as well as yield improved performance over both a FRP propeller and an aluminum propeller in terms of time to plane and top speed. Having the core be a composite injection molded part allows for good process control over blade section shape. For example, on a stainless steel or aluminum propeller, significant post-mold processing is required before the propeller is ready for use. In contrast, both the injection molding process and metal coating process allow the manufacturer to control leading edge shape and thickness of the propeller blades without post-processing.

Now with reference to FIGS. 7-9, another example of a propeller 510 for a marine propulsion device configured for use on a boat will be described. Similar to the propellers described hereinabove, the propeller 514 has a hub 512 extending along a longitudinal axis 532 and a plurality of blades 514, each blade 514 having a blade root 534 attached to the hub 512 and extending radially outwardly from the longitudinal axis 532 toward a respective blade tip 522. Each blade 514 has a leading edge 524, a trailing edge 526, a blade front (opposite), and a blade back 530. Each blade 514 comprises a polymer-based core 540. As shown by the hatching, each blade 514 is coated with a metal coating 542 that extends from the blade root 534 radially outwardly toward the blade tip 522. The metal coating 542 extends from the leading edge 524 to the trailing edge 526 of each blade 514 and is located on both the blade face (opposite) and the blade back 530 of each blade 514. As was the case with the first example, the hub 512 may be made of a polymer-based core and may be coated with the metal coating as well. However, unlike the first example, in the example of FIGS. 7-9, the blade tips 522 are not coated with the metal coating 542. Instead, the blade tips 522 are uncoated such that, at the blade tips 522, the exposed polymer-based core 540 is configured to deflect in such a way that a pitch of the propeller 510 decreases as a forward thrust of the propeller 510 increases. This is shown by the illustration in FIG. 8, in which the blade 514 is shown in cross-section, and is shown to deflect from the position shown at "A" to the position shown at "B" under load, which deflection is toward the transom of the marine vessel on which the propeller 510 is installed.

Such loss of pitch is by design. Fixed pitch or fully rigid propellers are typically designed for one specific running condition to allow the boat to achieve its highest possible top speed. This usually requires a propeller with a higher pitch than is desired to give good hole-shot and acceleration. It is much easier for the prime mover to turn a lower pitch propeller during acceleration-type events, as the hydrodynamic torque on the lower pitch propeller is lower than it would be on a higher pitch propeller of the same diameter. This ultimately allows the rotation of the prime mover to "spool up" more quickly and more power to be transferred to the water for the lower pitch propeller. Thus, the present inventors have realized that the abovementioned benefits of fully coating a polymer-based propeller blade (as with the propeller 410) can be achieved, while at the same time providing variable pitch, as desired for some installations, by not coating the blade tips 522. For example, note that the metal coated polymer-based blades 514 have a maximum cross-sectional thickness that is less than a maximum cross-sectional thickness of blades of an aluminum propeller 10 having the same power rating as the propeller 510 having the metal coated polymer-based blades 514, thus providing the propeller with increased efficiency.

Figures 8, 9:
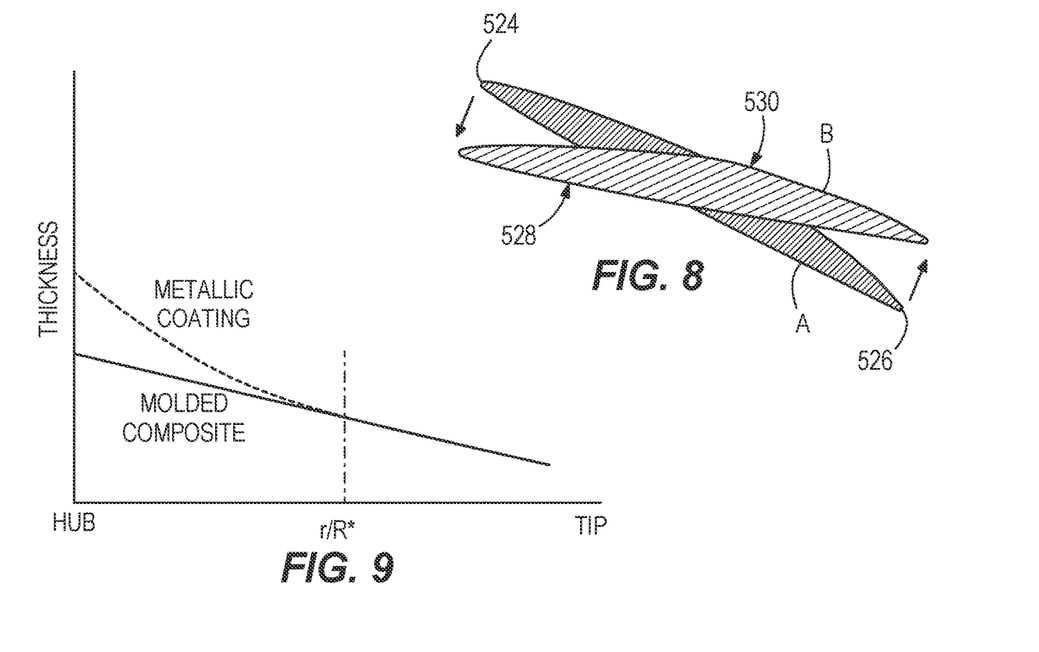
FIG. 8 illustrates a cross-section of a blade of the propeller of FIG. 7, taken along the line VIII-VIII of FIG. 7.
FIG. 9 is a chart depicting the thickness of a metal coating on the blades of the propeller of FIG. 7.

As shown in FIG. 9, the metal coating 542 is thickest at the blade roots 534 and tapers to become thinner as it extends toward the blade tips 522. The metal coating 542 may be about 0.015 inches thick at the blade root 534. In general, the outboard point to which the metal coating 542 is applied should be tuned such that the pitching moments and torsional stiffness of the composite core 540 produce adequate pitch deflection at the blade tip 522. In one example, this is about 0.5 inches to about 1 inch of pitch reduction during a static thrust event. In one example, the thickness of the metal coating 542 tapers to zero at a non-dimensional radius (r/R*) of the propeller 510 of about 60% to about 80%. In another example, the thickness of the metal coating 542 tapers to zero at a non-dimensional radius r/R* of the propeller 510 of about 65% to about 75%. In one particular example, the thickness of the metal coating 542 tapers to zero at a non-dimensional radius r/R* of the propeller 510 of about 70%.

Figure 7:
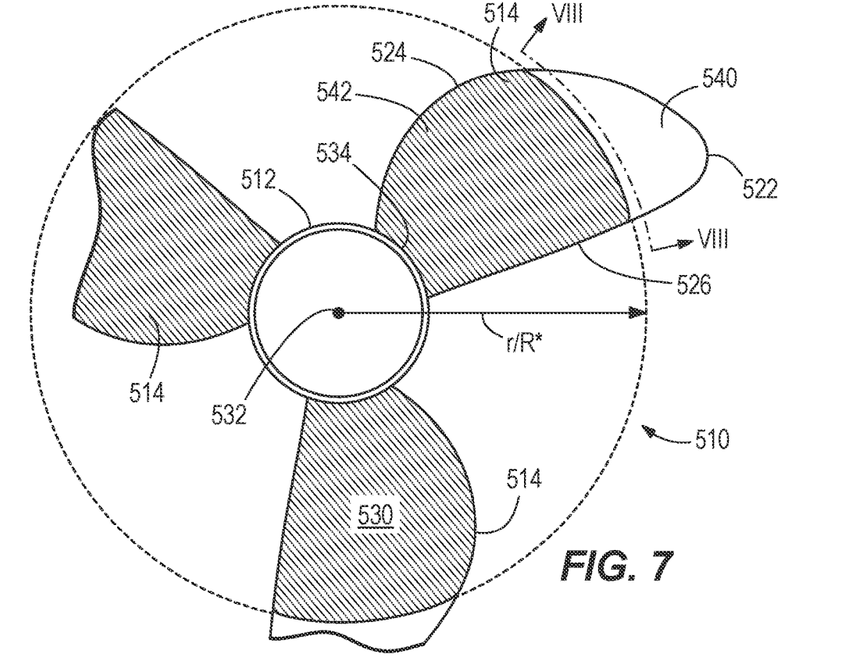
FIG. 7 illustrates a front view of another propeller of the present disclosure.

Coating the blades 514 in the manner shown in FIGS. 7 and 9 will allow the highly stressed root and mid-blade sections to be significantly more rigid than the outboard tip sections. At the same time, as thrust of the propeller 510 increases, the tip sections are able to twist in such a way that the pitch decreases as described with respect to FIG. 8, allowing the prime mover's speed to increase faster and transmit higher power to the propeller 510, thus improving acceleration. Thus, the propeller 510 has sufficient strength to provide good durability, while at the same time providing variable pitch to improve acceleration. The propeller 510 also has the benefits of increased fatigue life and improved boat performance noted hereinabove with respect to the fully coated propeller 410.

Figures 10, 11, 12:
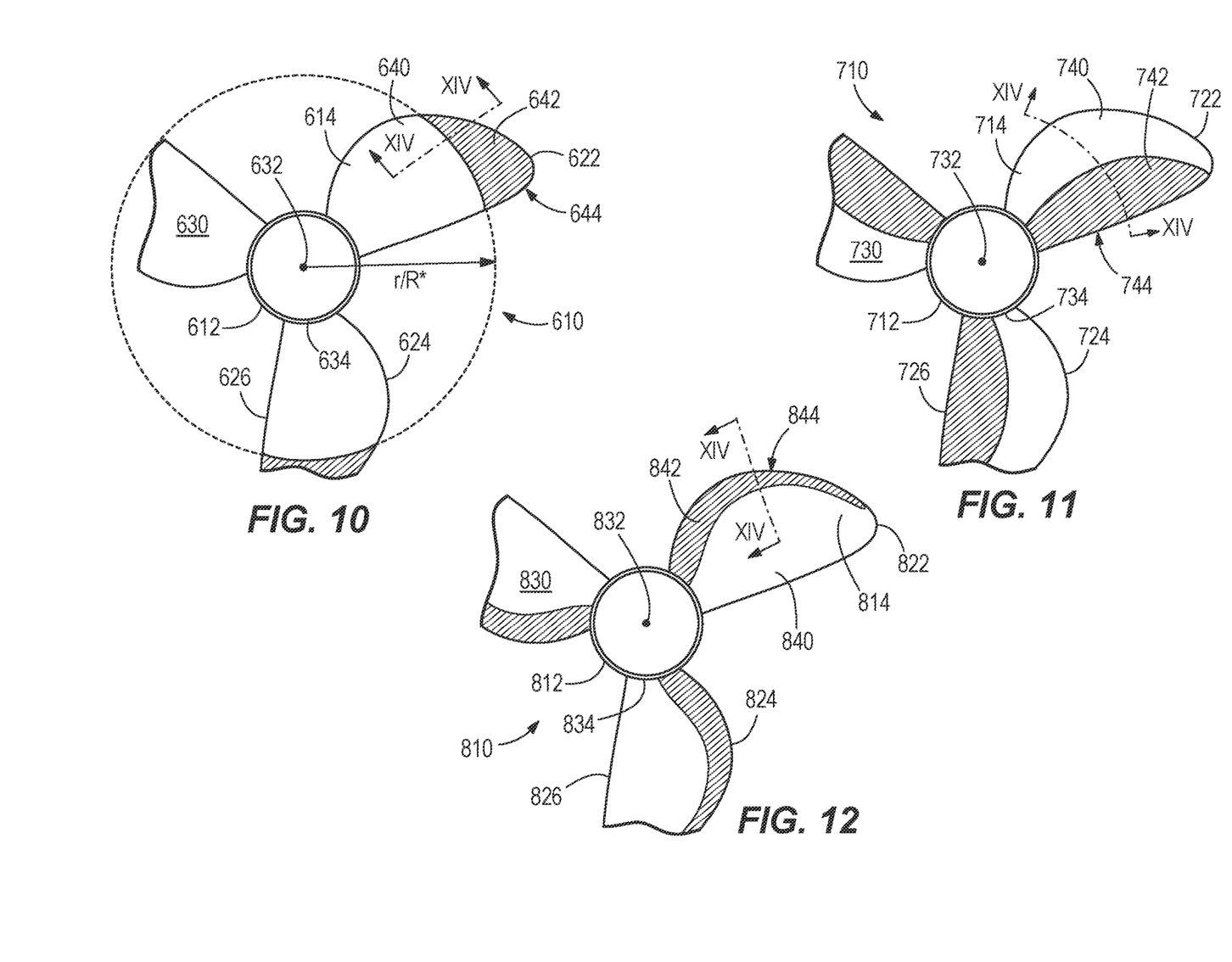
FIG. 10 illustrates another example of a propeller according to the present disclosure, wherein the tips of the blades of the propeller are provided with a metal coating.
FIG. 11 illustrates another example of a propeller according to the present disclosure, wherein the trailing edges of the blades of the propeller are provided with a metal coating.
FIG. 12 illustrates another example of a propeller according to the present disclosure, wherein the leading edges of the blades of the propeller are provided with a metal coating.

There are specific locations on an FRP injection molded propeller that are prone to damage, cracking, and failure. The present inventors have realized that if strength is increased in these key areas, the power operating band of the injection molded propeller can be increased. FIGS. 10-12 show three more examples of propellers 610, 710, 810 for a marine propulsion device configured for use on a boat in which such key areas are strengthened by application of a metal coating. Each propeller 610, 710, 810 includes a hub 612, 712, 812 extending along a longitudinal axis 632, 732, 832 and a plurality of blades 614, 714, 814. Each blade 614, 714, 814 has a blade root 634, 734, 834 attached to the hub 612, 712, 812 and extending radially outwardly from the longitudinal axis 632, 732, 832 toward a respective blade tip 622, 722, 822. Each blade 614, 714, 814 also has a leading edge 624, 724, 824, a trailing edge 626, 726, 826, a blade face (opposite), and a blade back 630, 730, 830. As with the examples hereinabove, each blade 614, 714, 814 comprises a polymer-based blade core 640, 740, 840.

Figure 14:
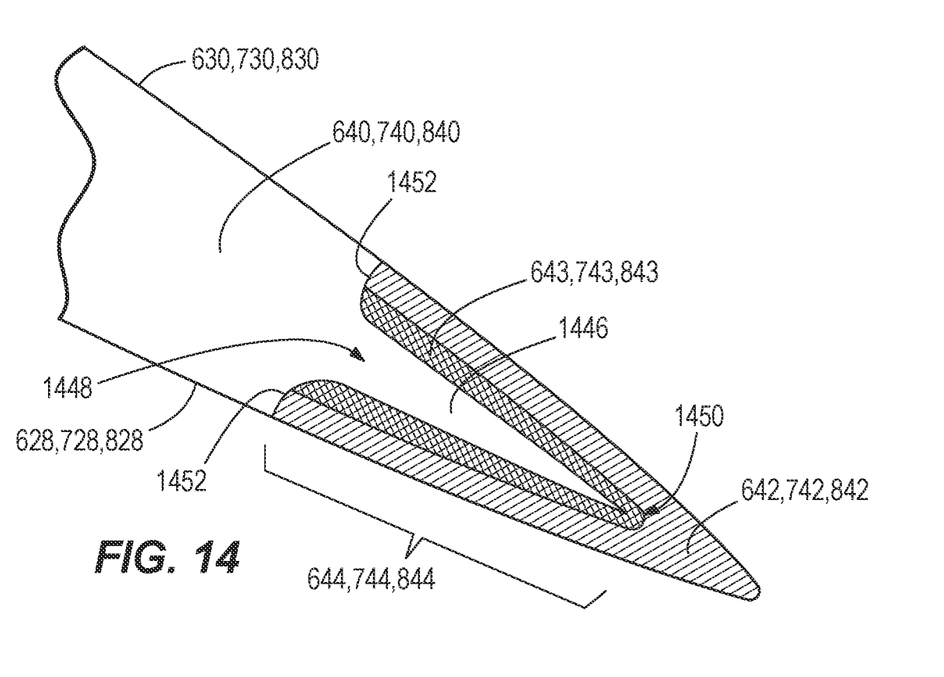
FIG. 14 illustrates a cross section of a portion of an outer edge of each of the blades of the propellers of FIGS. 10-12, taken along the line XIV-XIV in each of FIGS. 10-12.

Referring also to FIG. 14, a portion of an outer edge 644, 744, 844 of each blade core 640, 740, 840 comprises a flange 1446 that is stepped inwardly from both the blade face 628, 728, 828 and the blade back 630, 730, 830 of the blade core 640, 740, 840. The flange 1446 on each blade core 640, 740, 840 is smooth, that is, the outer surface of the flange 1446 is molded plastic that has not been roughened, sanded, or manually descaled. The flange 1446 on each blade core 640, 740, 840 gradually tapers from a thicker proximal end 1448 to a thinner distal end 1450. Each flange 1446 is electroless plated with a metal coating 642, 742, 842 that covers the flange 1446 and fills in the steps 1452 on the blade face 628, 728, 828 and the blade back 630, 730, 830 of the blade core 640, 740, 840 to provide a desired blade section. Generally, the desired blade section will be one in which there is no step or differential in slope where the outer surface of the blade face 628, 728, 828 and the blade back 630, 730, 830 meet the outer surface of the metal coating, 642, 742, 842. In some examples, a binding layer 643, 743, 843, such as a copper-containing layer, is provided between the metal coating 642, 742, 842 and the polymer-based blade core 640, 740, 840. Additional pre-processing of the polymer surface may be required as described herein below. Although not shown in FIGS. 10-12, it should be understood that the metal coatings 642, 742, 842 are provided to the same extent on the opposite blade faces as they are shown to extend on the blade backs 630, 730, 830.

Figure 13:
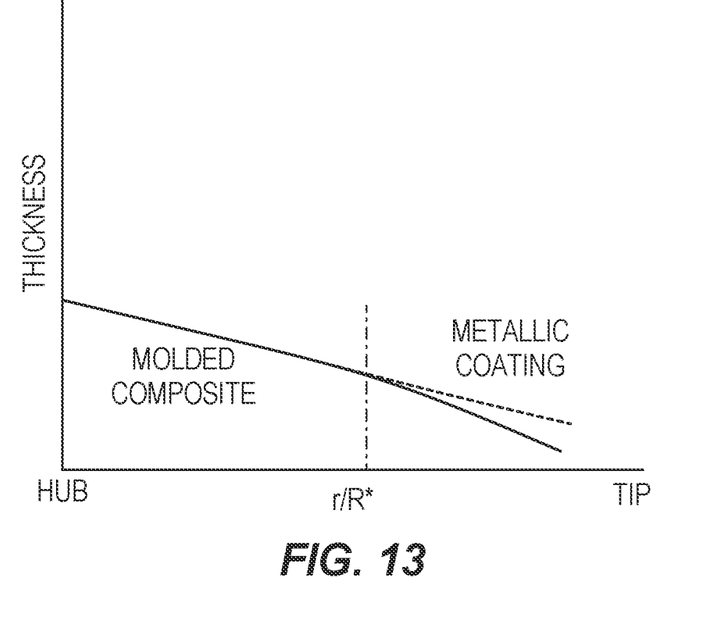
FIG. 13 is a chart depicting the thickness of the metal coating on the blades of the propeller of FIG. 10.

As shown in FIG. 10, the portion of the outer edge 644 of each blade core 640 can be the blade tip 622. Coating the blade tips 622 with the metal coating 642 can help provide wear protection from collision with sandbars, rocks, etc. The metal coating 642 can be applied as shown in FIG. 13, such that radially outwardly from a given non-dimensional radius r/R*, the metal coating 642 begins and increases in thickness as the radius increases, until reaching a maximum thickness at the blade tip 622. The non-dimensional radius r/R* can be the same as that noted hereinabove, namely, about 60% to about 80%, about 65% to about 75%, or about 70%.

As shown in FIG. 11, the portion of the outer edge 744 of each blade core 740 can instead be the trailing edge 726. Coating the trailing edge 726 of each blade 714 will increase the fatigue life of the propeller 710 because the trailing edge 726 is the most highly stressed region of the blade 714, which is highly skewed. The present inventors realized that on a highly skewed propeller, such as a propeller used for boats, the trailing edge is the area on the propeller blade where the bending moment and twisting moment are both concentrated. Coating the trailing edge 726 of the blades 714 also increases the overall flexural rigidity of the blades 714.

As shown in FIG. 12, the portion of the outer edge 844 of each blade core 840 can be the leading edge 824. Coating the leading edges 824 of the blades 814 will increase toughness in the event of impact and will also increase the overall flexural rigidity of the blades 814. In one example, the blades 814 are coated to about 0.2 inches back from the leading edge 824.

The above propellers in FIGS. 10-12 each benefit from increased durability in the metal-coated areas. Further, increased strength can be provided with an overall lighter propeller, in comparison to an aluminum or stainless steel propeller of the same power rating.

In general, in each of the above examples of FIGS. 4-12, in order to realize the benefits of combining a composite blade with a metal coating, the metal coating 442, 542, 642, 742, 842 has a higher elastic modulus and a higher yield strength than the polymer-based core 440, 540, 640, 740, 840. In one example, the metal coating 442, 542, 642, 742, 842 comprises cobalt. For example, the metal coating 442, 542, 642, 742, 842 comprises 50-95% per weight of nickel and 5-50% cobalt. In another example, the metal coating 442, 542, 642, 742, 842 comprises at least 50% per weight of cobalt, 0-35% per weight of chromium, 0-25% per weight of tungsten, 0-25% per weight of phosphorous, 0-25% per weight of molybdenum, and 0-5% per weight of boron.

Those having ordinary skill in the art would understand that any metallic coating with sufficiently small grain size and yield strength and modulus comparable to carbon steel could be used. A copper-containing binding layer may be provided between the outer metal coating 442, 542, 642, 742, 842 and the polymer-based core 440, 540, 640, 740, 840. In some examples, the core 440, 540, 640, 740, 840 of each blade 414, 514, 614, 714, 814 comprises a fiber-reinforced plastic. The fiber-reinforced plastic may be glass fiber reinforced plastic or carbon fiber reinforced plastic. The fiber content may be at least 30% by volume of the polymer-based blade core 440, 540, 640, 740, 840. The injected plastics binder may be epoxy resin, nylon 6 resin, polyimide resin, or another suitable resin.

In some particular examples, according to the examples described hereinabove with respect to FIGS. 4 and 7, the combination of a glass fiber reinforced plastic or carbon fiber reinforced plastic blade core 440, 540, 640, 740, 840 having a yield strength of about 9,000 psi and coated with a cobalt-containing metal coating 442, 542, 642, 742, 842 of between about 0.015 to about 0.005 inches produced a propeller having a blade cross-sectional thickness less than that of the cross-sectional thickness of the blades of an aluminum propeller having the same power ratio.

Figure 15:
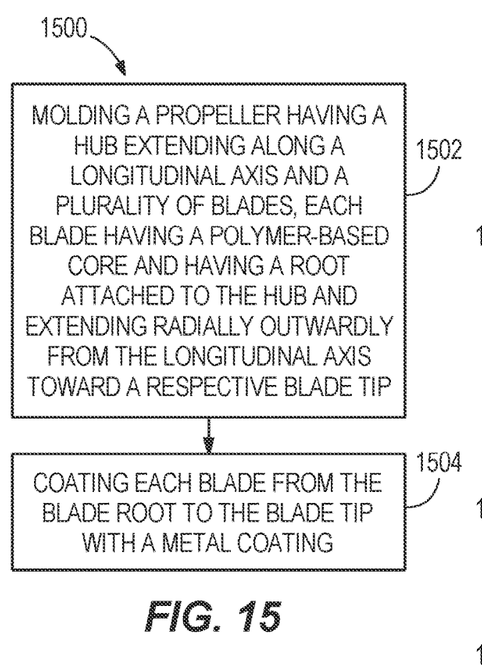
FIGS. 15, 16, and 17 illustrate methods for manufacturing propellers according to the present disclosure.
Figure 16:
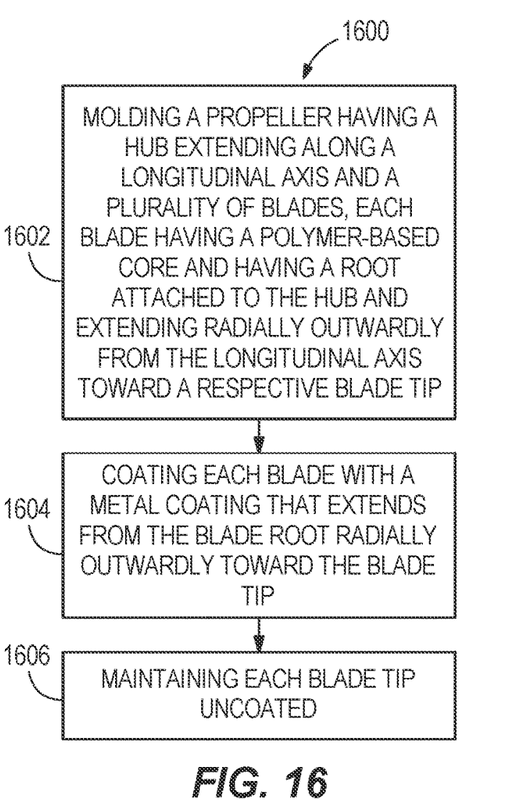
Figure 17:
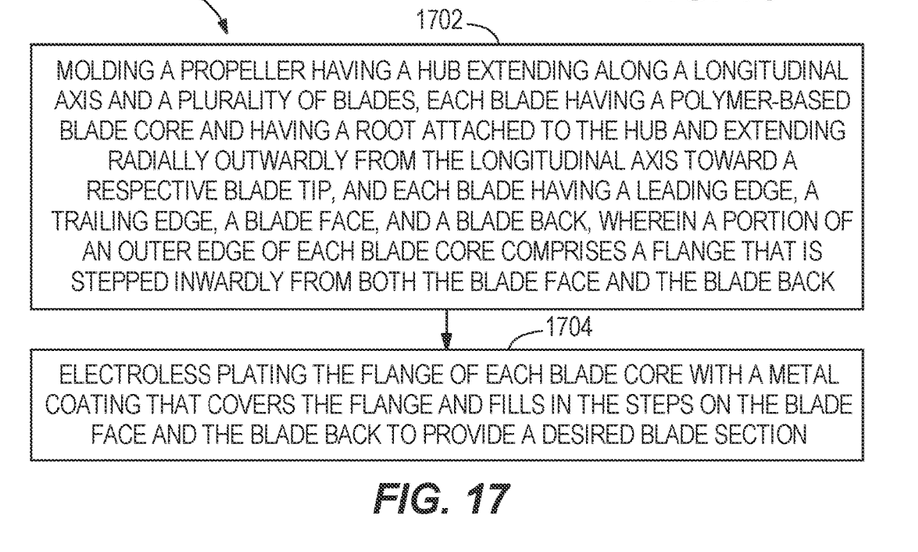

FIGS. 15-17 show several methods for making propellers according to the present disclosure.

A method 1500 of making a propeller 410 (FIGS. 4 and 5B) for a marine propulsion device configured for use on a boat is shown in FIG. 15. The method includes molding a propeller 410 having a hub 412 extending along a longitudinal axis 432 and a plurality of blades 414, each blade 414 having a polymer-based core 440 and having a blade root 434 attached to the hub 412 and extending radially outwardly from the longitudinal axis 432 toward a respective blade tip 422, as shown at 1502. In one example, the step of molding the propeller 410 comprises molding the core 440 of each blade 414 to have a design yield strength of at least 9,000 psi. The step of molding the propeller 410 may comprise injection molding a fiber preform with a plastics binder, such as the epoxy, nylon 6, or polyimide resins described hereabove. The fiber preform may be made by draping a woven fabric in a desired shape or other known FRP manufacturing methods.

The method 1500 also includes coating each blade 414 from the blade root 434 to the blade tip 422 with a metal coating 442, as shown at 1504. In some examples, the step of coating each blade 414 comprises coating the entireties of the blade face 428 and the blade back 430 thereof with the metal coating 442. In yet another example, the step of coating each blade 414 comprises coating each blade 414 such that the metal coated polymer-based blades 414 have a maximum cross-sectional thickness that is less than a maximum cross-sectional thickness of blades of an aluminum propeller 10 having the same power rating as the propeller 410 having the metal coated polymer-based blades 414. In some examples, the method further comprises coating the hub 412 with the metal coating 442.

In some examples, the step of coating each blade 414 with the metal coating 442 comprises electroless plating each blade 414 with the metal coating 442. The person skilled in the art of metallization of polymeric substrates will know how to metalize suitable polymeric substrates. In broad terms the metallization process involves a series of steps, namely: etching, neutralization, noble metal catalytic seeding, catalyst reduction (acceleration) and electroless deposition. During the etching step, the polymeric substrate is attacked by the etching medium, usually a strong oxidizing agent, thereby increasing the surface area, making the surface hydrophilic, and forming micro-pores on the surface providing the bonding sites for the metal to be deposited. Commonly used etchants include sulfuric-chromic acid, alkaline permanganates, and bifluorides, to name a few. After etching, the surfaces are thoroughly rinsed and immersed in a neutralizer solution, such as sodium bisulfite removing excess etchant from the polymer substrates. Following neutralization, the polymeric substrates are immersed in an activator solution which contains a noble metal catalyst, which is seeded on to the polymeric substrate. Typical noble metal catalysts include palladium, platinum or gold, with the palladium-tin system being the most commonly used.

After the activation process, which embeds the metallic catalyst on the polymeric surface, the surface is treated with the accelerator, which removes the hydrolysis products around the metal catalyst particles, leaving the metal catalyst exposed to the electroless deposition process. The final process step in the metallization sequence is the electroless deposition process. The electroless metal deposition formulations consist of a semi-stable solution containing a metal salt, a reducer, a complexing agent for the metal, a stabilizer, and a buffer system. When idle, the bath is stable, but when a noble metal catalyst-bearing surface is in contact with the solution, a chemical reduction of metal occurs at the catalyst sites and, through autocatalysis, the reduction reaction continues until the part to be electroless plated is removed.

One example of a Co-bearing Ni- and Cu-free electroless deposition process, with electroless Co as the metallization layer, is described in U.S. Patent Application Publication No. 2014/0255722, which was incorporated herein by reference above. The resulting metal coating 442 may include a first layer representing a metallized Co-bearing layer on the outside surface of the polymer substrate (the polymer-based blade core) and a second layer representing a fine-grained Co-bearing layer, serving as the outer surface of the propeller 410.

In other examples, the metal coating 442 is produced by DC or pulse electrodeposition, physical vapor deposition (PVD), chemical vapor deposition (CVD), gas condensation, or the like.

In one example, the step of coating each blade 414 with a metal coating 442 comprises coating each blade 414 such that the metal coating 442 is thicker at the blade roots 434 than at the blade tips 422. In one example, step of coating each blade 414 with a metal coating 442 comprises applying the metal coating 442 such that the metal coating 442 at each blade tip 422 has a thickness that is about 25% to about 35% of a thickness of the metal coating 442 at each blade root 434. In one example, the step of coating each blade 414 with a metal coating 442 comprises applying the metal coating 442 such that the metal coating 442 at the blade tips 422 is less than or equal to 0.005 inches thick.

In order to use the electroless plating method described hereinabove and provide a varying thickness to the metal coating 442, the electroless plating can take place in a mold having an interior surface that is offset from the outer surface of the polymer-based core 440 of the propeller blades 414 by the desired thickness of the metal coating 442 at desired locations on the blades 414. The metal coating will fill the gap between the outer surface of the polymer-based core and the inner surface of the mold.

A method 1600 of making a propeller 510 (FIG. 7) for a marine propulsion device configured for use on a boat is shown in FIG. 16. The method 1600 includes molding a propeller 510 having a hub 512 extending along a longitudinal axis 532 and a plurality of blades 514, each blade 514 having a polymer-based core 540 and having a blade root 534 attached to the hub 512 and extending radially outwardly from the longitudinal axis 532 toward a respective blade tip 522, as shown at 1602. The step of molding the propeller 510 may comprise injection molding a fiber preform with a plastics binder coating, as described herein above with respect to the method 1500.

The method 1600 also includes coating each blade 514 with a metal coating 542 that extends from the blade root 534 radially outwardly toward the blade tip 522, as shown at 1604. The step of coating each blade 514 with a metal coating 542 may comprise electroless plating each blade 514 with the metal coating 542, as described hereinabove with respect to the method 1500, or using any of the other coating techniques noted. The method may further comprise coating the hub 512 with the metal coating 542.

As shown at 1606, the method also includes maintaining each blade tip 522 uncoated. For example, those having ordinary skill in the art know that surfaces not to be coated with the metal coating 542 can be suitably masked using lacquers, rubber-based coatings, hard masks, and/or tapes. Such a masking would be attached to the blade tips 522 of the blades 514 in a desired shape and to a desired non-dimensional radius r/R* on each blade 514.

In some examples, the step of coating each blade 514 with a metal coating 542 comprises coating each blade 514 such that the metal coating 542 is thickest at the blade roots 534 and tapers to become thinner as it extends towards the blade tips 522. This can be done by carrying out the coating process in a suitably designed mold, as described hereinabove with respect to the method 1500. In one example, the step of coating each blade 514 with the metal coating 542 comprises applying the coating such that the thickness of the metal coating 542 tapers to zero at a non-dimensional radius r/R* of the propeller 510 of about 60% to about 80%. In one example, the step of coating each blade 514 with the metal coating 542 comprises applying the coating such that the thickness of the metal coating 542 tapers to zero at a non-dimensional radius r/R* of the propeller 510 of about 65% to about 75%. In one particular example, the step of coating each blade 514 with the metal coating 542 comprises applying the coating such that the thickness of the metal coating 542 tapers to zero at a non-dimensional radius r/R* of the propeller 510 of about 70%.

In yet another example, the step of coating each blade 514 comprises coating each blade 514 such that the metal coated polymer-based blades 514 have a maximum cross-sectional thickness that is less than a maximum cross-sectional thickness of blades of an aluminum propeller 10 having the same power rating as the propeller 510 having the metal coated polymer-based blades 514.

A method 1700 of making a propeller 610 (FIG. 10), 710 (FIG. 11), or 810 (FIG. 12) for a marine propulsion device configured for use on a boat is shown in FIG. 17. The method 1700 includes molding a propeller 610, 710, 810 having a hub 612, 712, 812 extending along a longitudinal axis 632, 732, 832 and a plurality of blades 614, 714, 814, each blade having a polymer-based blade core 640, 740 840 and having a blade root 634, 734, 834 attached to the hub and extending radially outwardly from the longitudinal axis toward a respective blade tip 622, 722, 822, and each blade having a leading edge 624, 724, 824, a trailing edge 626 726, 826, a blade face 628, 728, 828, and a blade back 630, 730, 830, wherein a portion of an outer edge 644, 744, 844 of each blade core comprises a flange 1446 that is stepped inwardly from both the blade face and the blade back, as shown at 1702. In one example, the step of molding the propeller 610, 710, 810 comprises injection molding a fiber preform with a plastics binder, as described hereinabove with respect to the method 1500. The flange 1446 can be formed by designing the mold to form the flanges integrally with the remainder of the blade core. In one example, the step of molding the propeller includes molding the flange 1446 on each blade core to be smooth and to taper gradually from a thicker proximal end 1448 to a thinner distal end 1450.

The method 1700 includes electroless plating the flange 1446 of each blade core with a metal coating 642, 742, 842 that covers the flange 1446 and fills in the steps 1452 on the blade face and the blade back to provide a desired blade section, as shown at 1704. The electroless plating can be carried out as described hereinabove with respect to the method 1500. Any areas not to be coated with metal can be masked as described with respect to the method 1600.

In one example, the step of electroless plating the flange 1446 comprises depositing a binder layer 643, 743, 843 on the polymer-based blade core 640, 740, 840, and subsequently depositing the metal coating on the binder layer. For example, the metal coating 642, 742, 842 may include a first layer representing a metallized Co-bearing layer deposited directly on the outside surface of the blade core 640, 740, 840 and a second layer representing a fine-grained Co-bearing layer, serving as the outer surface of the propeller 610, 710, 810 in the coated area.

In one example, the portion of the outer edge 644 of each blade core is the blade tip 622, as shown in FIG. 10. The remainder of the blade 614 can be masked to prevent it from being coated.

In another example, as shown in FIG. 11, the portion of the outer edge 744 of each blade core is the leading edge 726. The remainder of the blade 714 can be masked to prevent it from being coated. In one example, the step of electroless plating the flange 1446 comprises electroless plating the metal coating 742 no more than 0.2 inches back from the leading edge 726.

In one example, as shown in FIG. 12, the portion of the outer edge 844 of each blade core is the trailing edge 824. The remainder of the blade 814 can be masked to prevent it from being coated. In one example, the step of electroless plating the flange 1446 comprises electroless plating the metal coating 842 no more than 0.5 inches forward from the trailing edge 826. In one example, the metal coating 842 extends about 0.2 inches to about 0.5 inches forward from the trailing edge 826.

In the present description, certain terms have been used for brevity, clarity, and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims.

What is claimed is:

1. A propeller for a marine propulsion device configured for use on a boat, the propeller comprising:
    an inner hub extending along a longitudinal axis and configured to be attached to a propeller shaft of the marine propulsion device;
    an outer hub coaxially surrounding the inner hub;
    a plurality of ribs rigidly attaching the outer hub to the inner hub; and
    a plurality of blades, each blade having a blade root integrally formed with the outer hub and extending radially outwardly from the longitudinal axis toward a respective blade tip;
    wherein each blade comprises a polymer-based core;
    wherein each blade is coated from the blade root to the blade tip with a metal coating such that each blade in the plurality of blades is a metal coated polymer-based blade;
    wherein a thickness of the metal coating at each blade root is less than or equal to 0.015 inches, a thickness of the metal coating at each blade tip is less than or equal to 0.005 inches, and the thickness of the metal coating at each blade tip is about 25% to about 35% of the thickness of the metal coating at each blade root; and
    wherein the polymer-based core of each blade has a design yield strength of between 9,000 psi and 20,000 psi.

2. The propeller of claim 1, wherein the propeller is configured such that a maximum stress on each metal coated polymer-based blade when the propeller is producing a maximum thrust is about 15% to about 25% of a design yield strength of each metal coated polymer-based blade.

3. The propeller of claim 1, wherein each blade has a blade face and a blade back; and
    wherein each blade is coated with the metal coating over the entireties of the blade face and the blade back thereof.

4. The propeller of claim 1, wherein the metal coating of each blade comprises cobalt and the polymer-based core of each blade comprises a fiber-reinforced plastic.

5. The propeller of claim 1, wherein the metal coating of each blade has a higher elastic modulus and a higher yield strength than the polymer-based core of each blade.

6. The propeller of claim 1, wherein the outer hub comprises a polymer-based core and is coated with the metal coating.

* * * * *